(12) United States Patent
Sun et al.

(10) Patent No.: US 12,501,418 B2
(45) Date of Patent: Dec. 16, 2025

(54) RESOURCE SCHEDULING METHOD, COMMUNICATIONS DEVICE, NETWORK DEVICE, AND STORAGE MEDIUM

(71) Applicant: VIVO MOBILE COMMUNICATION CO., LTD., Guangdong (CN)

(72) Inventors: Yanliang Sun, Guangdong (CN); Xiaodong Yang, Guangdong (CN); Yue Hong, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 610 days.

(21) Appl. No.: 17/858,278

(22) Filed: Jul. 6, 2022

(65) Prior Publication Data
US 2022/0338207 A1    Oct. 20, 2022

Related U.S. Application Data

(63) Continuation of application No. PCT/CN2020/142296, filed on Dec. 31, 2020.

(30) Foreign Application Priority Data

Jan. 7, 2020    (CN) .......................... 202010015253.1

(51) Int. Cl.
*H04W 72/121*    (2023.01)
*H04L 5/00*    (2006.01)
*H04W 72/20*    (2023.01)

(52) U.S. Cl.
CPC ......... *H04W 72/121* (2013.01); *H04L 5/0042* (2013.01); *H04W 72/20* (2023.01)

(58) Field of Classification Search
CPC .................................................. H04W 72/121
See application file for complete search history.

(56) References Cited

U.S. PATENT DOCUMENTS

2014/0073312 A1*   3/2014   Su ........................ H04B 1/0067
                                                          455/419
2016/0056935 A1    2/2016   Damnjanovic et al.
(Continued)

FOREIGN PATENT DOCUMENTS

CN    105191474 A    12/2015
CN    105763308 A    7/2016
(Continued)

*Primary Examiner* — Jason E Mattis
(74) *Attorney, Agent, or Firm* — Price Heneveld LLP

(57) ABSTRACT

Resource scheduling method, communications device, network device and storage medium are disclosed. The method is applied to a communications device including UE1 and UE2. The method includes: sending a time-division multiplexing pattern request to a network side device, where the network side device includes a first network side device and/or a second network side device; receiving response information of a time-division multiplexing pattern sent by the network side device according to the time-division multiplexing pattern request, where the response information of a time-division multiplexing pattern includes configuration information of a time-division multiplexing pattern and/or confirmation information of a time-division multiplexing pattern; and determining, according to the response information of a time-division multiplexing pattern, a first transmission time window for the UE1 and a second transmission time window for the UE2, where the first transmission time window and the second transmission time window do not overlap.

19 Claims, 6 Drawing Sheets

---

Send a time-division multiplexing pattern request to a network side device — S101

Receive response information of a time-division multiplexing pattern sent by the network side device according to the time-division multiplexing pattern request — S102

Determine a first transmission time window for UE1 and a second transmission time window for UE2 according to the response information of a time-division multiplexing pattern — S103

(56) References Cited

U.S. PATENT DOCUMENTS

| | | | |
|---|---|---|---|
| 2016/0081085 A1 | 3/2016 | Jeong et al. | |
| 2016/0249408 A1* | 8/2016 | Thiruvenkatachari | H04W 76/38 |
| 2016/0295637 A1* | 10/2016 | Bergquist | H04W 24/08 |
| 2016/0323933 A1* | 11/2016 | Song | H04W 8/183 |
| 2017/0127439 A1* | 5/2017 | Gopal | H04W 72/1263 |
| 2019/0053130 A1 | 2/2019 | Guo et al. | |
| 2021/0037468 A1* | 2/2021 | Huang | H04W 72/044 |
| 2021/0105791 A1* | 4/2021 | Wang | H04W 72/20 |
| 2022/0240213 A1* | 7/2022 | Ly | H04W 48/18 |

FOREIGN PATENT DOCUMENTS

| | | |
|---|---|---|
| CN | 106664673 A | 5/2017 |
| CN | 107769825 A | 3/2018 |
| WO | 2017136989 A1 | 8/2017 |
| WO | 2018141081 A1 | 8/2018 |
| WO | 2019027619 A1 | 2/2019 |

\* cited by examiner

RESOURCE SCHEDULING METHOD, COMMUNICATIONS DEVICE, NETWORK DEVICE, AND STORAGE MEDIUM

CROSS-REFERENCE TO RELATED APPLICATIONS

This application is continuation application of PCT International Application No. PCT/CN2020/142296 filed on Dec. 31, 2020, which claims priority to Chinese Patent Application No. 202010015253.1, entitled "RESOURCE SCHEDULING METHOD, COMMUNICATIONS DEVICE, NETWORK DEVICE, AND STORAGE MEDIUM", filed on Jan. 7, 2020, which are incorporated herein by reference in their entireties.

TECHNICAL FIELD

Embodiments of this application relate to the field of communications technologies, and in particular to a resource scheduling method, a communications device, a network device, and a storage medium.

BACKGROUND

With the development of communications technologies, a dual-card terminal is increasingly widely applied. The dual-card terminal is a terminal that includes two subscriber identity module (SIM) cards. Both the two SIM cards can correspond to signal transmission and signal reception separately.

Due to the limitation of a support for signal reception and transmission capability of the dual-card terminal, the dual-card terminal cannot receive signals from two SIM cards simultaneously or cannot transmit signals from the two SIM cards simultaneously. That is, resource competition occurs between the two SIM cards. The resource competition leads to a direct consequence that a service of at least one of the two SIM cards cannot be executed normally, which reduces reliability for service processing of the dual-card terminal.

SUMMARY

According to a first aspect, an embodiment of this application provides a resource scheduling method, applied to a communications device, where the communications device includes a first terminal UE1 and a second terminal UE2. The method includes: sending a time-division multiplexing pattern request to a network side device, where the network side device includes a first network side device and/or a second network side device; receiving response information of a time-division multiplexing pattern sent by the network side device according to the time-division multiplexing pattern request, where the response information of a time-division multiplexing pattern includes configuration information of a time-division multiplexing pattern and/or confirmation information of a time-division multiplexing pattern; and determining, according to the response information of a time-division multiplexing pattern, a first transmission time window for the UE1 and a second transmission time window for the UE2, where the first transmission time window and the second transmission time window do not overlap.

According to a second aspect, an embodiment of this application provides a resource scheduling method, applied to a network device. The method includes: receiving a time-division multiplexing pattern request sent by a communications device, where the time-division multiplexing pattern request is used to request a first transmission time window for a first terminal UE1 of the communications device and/or a second transmission time window for a second terminal UE2 of the communications device; and sending response information of a time-division multiplexing pattern to the communications device according to the time-division multiplexing pattern request, where the response information of a time-division multiplexing pattern includes configuration information of a time-division multiplexing pattern or confirmation information of a time-division multiplexing pattern, where the first transmission time window and the second transmission time window indicated by the response information of the time-division multiplexing pattern do not overlap.

According to a third aspect, an embodiment of this application provides a communications device, where the communications device has a first terminal UE1 and a second terminal UE2, and the communications device includes: a sending module, configured to send a time-division multiplexing pattern request to a network side device, where the network side device includes a first network side device and/or a second network side device; a receiving module, configured to receive response information of a time-division multiplexing pattern sent by the network side device according to the time-division multiplexing pattern request, where the response information of a time-division multiplexing pattern includes configuration information of a time-division multiplexing pattern and/or confirmation information of a time-division multiplexing pattern; and a processing module, configured to determine a first transmission time window for the UE1 and a second transmission time window for the UE2 according to the response information of a time-division multiplexing pattern, where the first transmission time window and the second transmission time window do not overlap.

According to a fourth aspect, an embodiment of this application provides a network device, including: a receiving module, configured to receive a time-division multiplexing pattern request sent by a communications device, where the time-division multiplexing pattern request is used to request a first transmission time window for a first terminal UE1 of the communications device and/or a second transmission time window for a second terminal UE2 of the communications device; and a sending module, configured to send response information of a time-division multiplexing pattern to the communications device according to the time-division multiplexing pattern request, where the response information of a time-division multiplexing pattern includes configuration information of a time-division multiplexing pattern or confirmation information of a time-division multiplexing pattern, where the first transmission time window and the second transmission time window that are indicated by the response information of a time-division multiplexing pattern do not overlap.

According to a fifth aspect, an embodiment of this application provides a communications device, including a processor, a memory, and a computer program that is stored in the memory and that can be run on the processor, where when the computer program is executed by the processor, the resource scheduling method in a technical solution according to the first aspect is implemented.

According to a sixth aspect, an embodiment of this application provides a network device, including a processor, a memory, and a computer program that is stored in the memory and that can be run on the processor, where when the computer program is executed by the processor, the resource scheduling method in a technical solution according to the second aspect are implemented.

According to a seventh aspect, an embodiment of this application provides a computer-readable storage medium, where the computer-readable storage medium stores a computer program, and when the computer program is executed by a processor, the resource scheduling method in a technical solution according to the first aspect or the resource scheduling method in a technical solution according to the second aspect is implemented.

In an embodiment of this application, the communications device sends the time-division multiplexing pattern request to the first network side device to request response information of a time-division multiplexing pattern to the network side device. The first transmission time window for the UE1 and the second transmission time window for the UE2 are determined according to the response information of a time-division multiplexing pattern sent by the network side device. The response information of a time-division multiplexing pattern includes configuration information of a time-division multiplexing pattern and/or confirmation information of a time-division multiplexing pattern. The first transmission time window and the second transmission time window do not overlap, so that UE1 and UE2 can be handed over quickly and send and receive data respectively in different transmission time windows, so as to prevent a resource conflict between the UE1 and UE2. Therefore, services of the UE1 and UE2 can be processed separately, and reliability for service processing of the communications device can be improved.

BRIEF DESCRIPTION OF DRAWINGS

This application may be better understood based on the following description of specific implementations of this application with reference to the accompanying drawings. The same or similar reference numerals indicate same or similar features.

DESCRIPTION OF EMBODIMENTS

Figure 1:
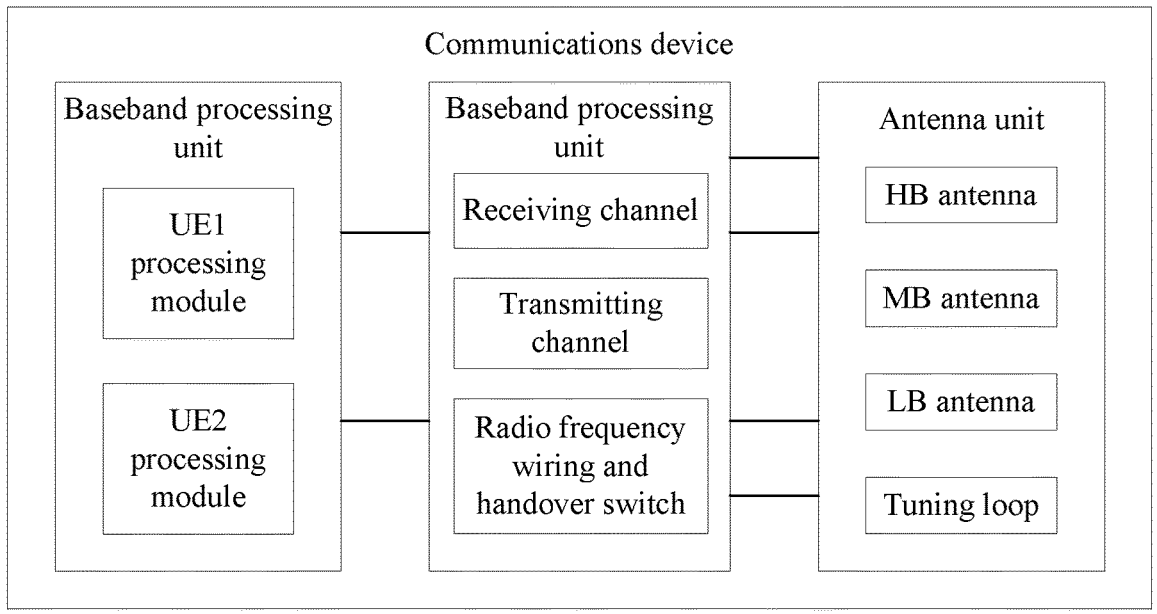
FIG. 1 is a schematic unit diagram of an example of a communications device according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Embodiments of this application provide a resource scheduling method, a communications device, a network device, and a storage medium, where the resource scheduling method can be applied to a scenario in which the communications device can support communication with a first network side device and a second network side device. The communications device includes a first terminal UE1 and a second terminal UE2, that is, the communications device is a multi-card terminal. The communications device may be specifically a mobile phone, a tablet computer, or the like, which is not limited herein. The first network side device and the second network side device may be devices such as a base station, which is not limited herein.

The first terminal UE1 and the second terminal UE2 mentioned in the embodiments of this application are both UEs, and may refer to a function of a communication reception and transmission protocol corresponding to a smart card, for example, including protocol stack functions such as network attached storage (NAS), radio resource control (RRC), Packet Data Convergence Protocol (PDCP), or radio link control (RLC). Each UE can independently receive a scheduling/configuration/power control command from a network side device, and perform data transmission and reception under the control of the network side device. That is, the UE may be a protocol entity and smart card corresponding to the smart card in the communications device. In a specific example, there is a one-to-one correspondence between a plurality of smart cards carried in the communications device and the plurality of UEs mentioned in the embodiments of this application. For example, the UE1 can independently receive the scheduling/configuration/power control command or the like from the first network side device, and perform data transmission and reception under the control of the first network side device. The UE2 can independently receive a scheduling/configuration/power control command or the like from the second network side device, and perform data transmission and reception under the control of the second network side device.

Therefore, it can be understood that one communications device may be a physical carrier of a plurality of logical UE functions, and each logical UE function corresponds to one smart card. In the embodiments of this specification, the logical UE function is also referred to as a UE corresponding to a smart card. The smart card in the embodiments of this specification may also be referred to as a SIM (that is, Subscriber Identity Module) card, a subscriber identity module card, or the like. In addition, the smart card in the embodiments of this specification may be an entity card, or may be a virtual card, for example, an embedded subscriber identity module (embedded-SIM, eSIM) card, which is not limited herein. For example, the communications device is a mobile phone, and the mobile phone may have two SIM cards, namely a first SIM card, SIM A, and a second SIM card, SIM B.

In some examples, two different sets of paths combining radio frequency with baseband exist in the communications device, which can respectively process data transmission and reception corresponding to the UE1 and UE2 simultaneously. The communications device supports a "2RX+2TX" mode, that is, the communications device can support simultaneous data transmission and simultaneous data reception of the UE1 and UE2. However, it should be noted that in a case that harmonic interference or intermodulation interference may occur in data transmission and reception between the UE1 and UE2, simultaneous data transmission or data reception between the UE1 and UE2 will have an adverse effect on communications.

In some other examples, two different sets of paths combining radio frequency with baseband exist in the communications device, which can respectively process data reception corresponding to the UE1 and UE2 simultaneously. However, only one set of paths combining radio frequency with baseband exists in the communications device, and only data transmission corresponding to the UE1 or UE2 can be processed simultaneously. The communications device supports a "2RX+1TX" mode, that is, the communications device supports simultaneous data reception of the UE1 and UE2, but does not support simultaneous data transmission of the UE1 and UE2.

In still other examples, only one set of paths combining radio frequency with baseband exists in the communications device, and only data transmission and reception of the UE1 or UE2 can be processed simultaneously. The communications device supports "1RX+1TX", that is, the communications device neither supports simultaneous data reception of the UE1 and UE2, nor support simultaneous data transmission of the UE1 and UE2.

For example, FIG. 1 is a schematic unit diagram of an example of a communications device according to an embodiment of this application. As shown in FIG. 1, the communications device includes a baseband processing unit, a radio frequency unit, and an antenna unit. The baseband processing unit may include a UE1 processing module and a UE2 processing module. The radio frequency unit may include a receiving channel, a transmitting channel, a radio frequency wiring and handover switch. The antenna unit may include a high band (HB) antenna, a middle band (MB) antenna, a low band (LB) antenna, and a tuning loop. It should be noted that the communications device includes but is not limited to the foregoing units, and each of the foregoing units includes but is not limited to the foregoing structures.

For a communications device that supports the "2RX+1TX" mode or "1RX+1TX" mode, in a case that the UE1 and UE2 are covered by networks in different frequency bands, for example, the UE1 and UE2 correspond to different operators separately, handover of the radio frequency unit and the antenna unit between frequency bands requires a long delay, such as 3 ms to 5 ms. When the UE1 and UE2 are covered by networks in the same frequency band, for example, when the UE1 and UE2 correspond to the same operator and are covered by the same cell, the UE1 and UE2 can implement relatively fast link handover.

For a communications device that supports the "2RX+2TX" mode, relatively fast handover can be implemented between the UE1 and UE2 by switching a switch status.

In the communications device, the UE1 may be used as a primary terminal and the UE2 may be used as a secondary terminal; alternatively, the UE1 may also be used as the secondary terminal and the UE2 may be used as the primary terminal, which is not limited herein. For example, the UE1 can be mainly used for data services, and the UE2 can be mainly configured to monitor calls and maintain basic call functions. When the UE1 processes a service such as an interactive service, a downloading service, or an uploading service, the UE2 performs a link maintenance task, such as call (that is, paging) monitoring, radio resource management (RRM) measurement, and an idle status operation such as cell reset, and resource contention may exist between the UE1 and UE2. When the UE1 processes a service, the UE2 needs to perform tracking area update (TAU), or a connection status operation such as voice over long-term evolution (VoLET), and resource contention may exist between the UE1 and UE2, resulting in a resource conflict. The resource conflict between the UE1 and UE2 has a bad influence on the overall service processing of the communications device, and reduces reliability for service processing of the communications device. By using the resource scheduling method, communications device, network device, system, and storage medium provided in the embodiments of this application, the resource conflict between the UE1 and UE2 can be effectively prevented, thereby improving the reliability for service processing of the communications device.

Figure 2:
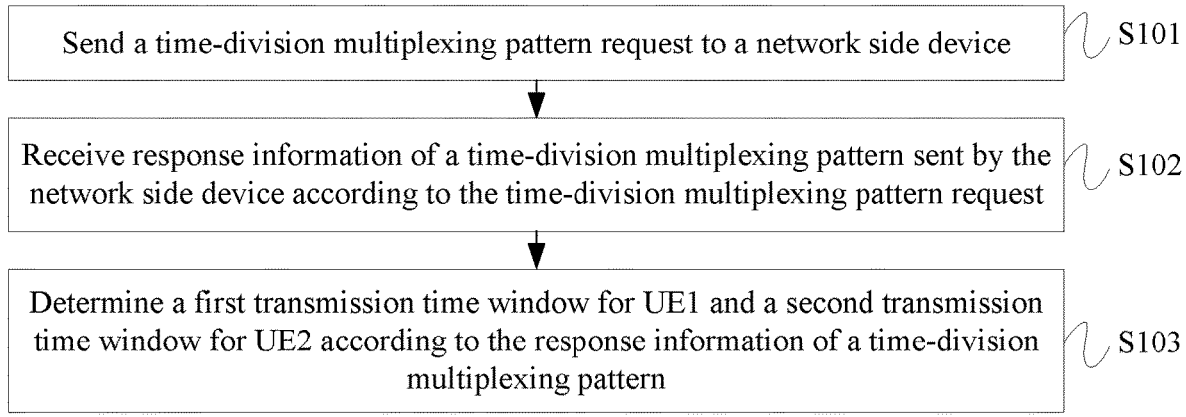
FIG. 2 is a flowchart of an embodiment of a resource scheduling method applied to a communications device according to this application.

FIG. 2 is a flowchart of an embodiment of a resource scheduling method applied to a communications device according to this application. As shown in FIG. 2, the resource scheduling method may include step S101 to step S103.

In step S101, a time-division multiplexing pattern request is sent to a network side device.

The network side device may include a first network side device and/or a second network side device. That is, the communications device can send the time-division multiplexing pattern request to the first network side device, can also send the time-division multiplexing pattern request to the second network side device, or can further send the time-division multiplexing pattern request to both the first network side device and the second network side device, which is not limited herein. The first network side device is a network side device that establishes communication with UE1, and the second network side device is a network side device that establishes communication with UE2.

The time-division multiplexing pattern request is used to request, to the first network side device, a time-division multiplexing pattern (TDM pattern) configured in the communications device. The time-division multiplexing pattern specifically refers to a pattern in which the UE1 and UE2 perform time-division multiplexing. Optionally, the time-division multiplexing pattern can be understood as a time domain pattern in which a network side temporarily performs RRC release and quickly restores a RRC connection. For example, in a time domain that is not connected to a current serving cell and that is defined by a time-division multiplexing pattern, the UE1 skips transmitting uplink and downlink data, and skips monitoring of any link maintenance behavior such as link monitoring. Similarly, in a time domain that is not connected to a current serving cell and that is defined by the time-division multiplexing pattern, the UE2 skips transmitting uplink and downlink data, and skips monitoring of any link maintenance behavior such as link monitoring. Determination of the time-division multiplexing pattern can be completed by the communications device or the network side device.

For example, the communications device can determine a selected time-division multiplexing pattern according to a service characteristic of the UE1 and a service characteristic of the UE2, and notify the first network side device of the time-division multiplexing pattern determined by the communications device. The first network side device issues, to the communications device, configuration information corresponding to the time-division multiplexing pattern determined by the communications device.

For another example, the communications device sends the time-division multiplexing pattern request to the first network side device. The first network side device determines a time-division multiplexing pattern for the UE1 and UE2 in the communications device according to the time-division multiplexing pattern request, and sends configuration information corresponding to the determined time-division multiplexing pattern to the communications device.

For still another example, the communications device sends the time-division multiplexing pattern request to the first network side device. The first network side device determines a time-division multiplexing pattern for the UE1 and UE2 in the communications device according to the time-division multiplexing pattern request, and sends configuration information corresponding to the determined time-division multiplexing pattern to the communications device. The communications device sends the time-division multiplexing pattern request to the second network side device. The second network side device sends confirmation information of time-division multiplexing to the communications device according to the time-division multiplexing pattern request.

In step S102, response information of a time-division multiplexing pattern sent by the network side device according to the time-division multiplexing pattern request is received.

The response information of a time-division multiplexing pattern may include configuration information of a time-division multiplexing pattern and/or confirmation information of a time-division multiplexing pattern. The configuration information of a time-division multiplexing pattern is used to configure the time-division multiplexing pattern of the UE1 and UE2 of the communications device. The confirmation information of a time-division multiplexing pattern is used to confirm the time-division multiplexing pattern of the UE1 and UE2 of the communications device.

The communications device can receive configuration information of a time-division multiplexing pattern sent by the first network side device. Alternatively, the communications device can receive the configuration information of a time-division multiplexing pattern sent by the first network side device and confirmation information of a time-division multiplexing pattern sent by the second network side device. Alternatively, the communications device can receive the confirmation information of a time-division multiplexing pattern sent by the first network side device. A sender of the configuration information of a time-division multiplexing pattern and a sender of the confirmation information of a time-division multiplexing pattern are not limited herein.

In step S103, a first transmission time window for the UE1 and a second transmission time window for the UE2 are determined according to the response information of a time-division multiplexing pattern.

The UE1 transmits and receives data within the first transmission time window. The UE2 transmits and receives data within the second transmission time window. The first transmission time window and the second transmission time window do not overlap, that is, the first transmission time window and the second transmission time window do not overlap in a time domain. The UE1 skips transmitting or receiving data in the second transmission time window, and the UE2 skips transmitting or receives data in the first transmission time window.

In some examples, the configuration information of a time-division multiplexing pattern may indicate a first transmission time window, and the communications device can use a part other than the first transmission time window in the time domain as the second transmission time window. The confirmation information of a time-division multiplexing pattern may be used to confirm the second transmission time window.

In some other examples, the configuration information of a time-division multiplexing pattern may directly indicate the first transmission time window and the second transmission time window. The confirmation information of a time-division multiplexing pattern may be used to confirm the second transmission time window.

In still some other examples, the confirmation information of a time-division multiplexing pattern may be further used to confirm the first transmission time window.

Data transmission and reception of the UE1 in the first transmission time window and data transmission and reception of the UE2 in the second transmission time window can be determined according to a specific work scenario and work requirements. For example, if the communications device supports a "2RX+1TX" mode, the UE1 transmits data in the first transmission time window, and the UE2 transmits data in the second transmission time window. Data reception by the UE1 and UE2 does not need to strictly comply with constraints on the first time window and the second transmission time window. For another example, if the communications device supports a "1RX+1TX" mode, the UE1 performs data reception and transmission in the first transmission time window, and the UE2 performs data reception and transmission in the second transmission time window.

In this embodiment of this application, an occasion in which the time-division multiplexing pattern request is sent by the communications device to the network side device is not defined. For example, for a communications device that supports the "2RX+1TX" mode or a communications device which supports the "2RX+2TX" mode but in which interference occurs with data transmission and reception of the UE1 and UE2, the communications device can send the time-division multiplexing pattern request to the network side device in a case that the UE1 processes a data service and is in a RRC connection status, and the UE2 is in an idle status. For another example, for a communications device that supports a "1RX+1TX" mode or a communications device which supports a "2RX+1TX" mode but in which interference with data reception of the UE1 and UE2 occurs, the communications device generates, in a case that the UE1 and UE2 are both in the idle status, the time-division multiplexing pattern request and sends the request to the network side device according to the needs of a call scenario for the UE2.

In this embodiment of this application, the communications device sends the time-division multiplexing pattern request to the network side device, and requests the response information of a time-division multiplexing pattern to the network side device. The first transmission time window for the UE1 and the second transmission time window for the UE2 are determined according to the response information of a time-division multiplexing pattern sent by the network side device. Requesting the response information of a time-division multiplexing pattern includes requesting the configuration information of a time-division multiplexing pattern and/or confirmation information of a time-division multiplexing pattern. The first transmission time window and the second transmission time window do not overlap, so that the UE1 and UE2 can be handed over quickly and send and receive data respectively in different transmission time windows, so as to prevent a resource conflict between the UE1 and UE2. Therefore, services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network side device can also obtain a status of the communications device, so as to facilitate coordination between the network side device and the communications device.

The time-division multiplexing pattern request in the foregoing embodiment includes a time-division multiplexing pattern identifier. The time-division multiplexing pattern identifier is used to identify the time-division multiplexing pattern. The communications device and the network side device can pre-stipulate a plurality of time-division multiplexing patterns, and a time-division multiplexing pattern selected by the communications device is determined by the time-division multiplexing pattern identifier in the time-division multiplexing pattern request. The time-division multiplexing pattern is a configuration mode for the first transmission time window and the second transmission time window. Each time-division multiplexing pattern may have corresponding configuration information of a time-division multiplexing pattern. For example, the communications device and the first network side device pre-stipulate four time-division multiplexing patterns, and time-division multiplexing pattern identifiers of the four time-division multiplexing patterns are 00, 01, 10, and 11, respectively. If a time-division multiplexing pattern request sent by the communications device to the first network side device includes that a time-division multiplexing pattern identifier is 10, the communications device receives configuration information of a time-division multiplexing pattern corresponding to the time-division multiplexing pattern identifier 10 selected by the first network side device.

Alternatively, the time-division multiplexing pattern request in the foregoing embodiment includes the time-division multiplexing pattern identifier and a time slot offset, that is, Offset. For content of the time-division multiplexing pattern identifier, reference may be made to the foregoing related descriptions, which is not described herein again. The time slot offset can be used to represent a position of a time window not occupied by the first transmission time window in a time domain or a position of the second transmission time window in the time domain. The time window not occupied by the first transmission time window in the time domain may include the second transmission time window. Therefore, in some cases, the second transmission time window in the time-division multiplexing pattern identified by the time-division multiplexing pattern identifier can be further finely set by the time slot offset. For example, if the time-division multiplexing pattern request sent by the communications device to the first network side device includes that a time-division multiplexing pattern identifier is 10, a time-division multiplexing pattern with the time-division multiplexing pattern identifier of 10 indicates that a length of the first transmission time window is greater than that of the second transmission time window, but does not indicate positions of the first transmission time window and the second transmission time window. Then, the position of the second transmission time window can be determined by the time slot offset, and the communications device can receive configuration information of a time-division multiplexing pattern sent by the first network side device according to the time-division multiplexing pattern identifier 10 and the time slot offset.

In some examples, the configuration information of a time-division multiplexing pattern in the foregoing embodiment may be used to indicate at least one of the following: the first transmission time window, the second transmission time window, or the time window not occupied by the first transmission time window in the time domain. The time window not occupied by the first transmission time window in the time domain may include the second transmission time window.

Figure 3:
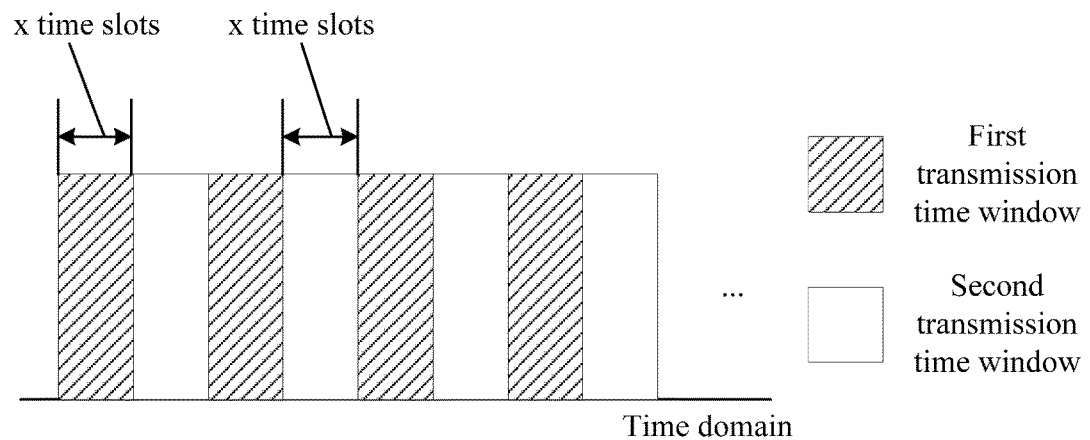
FIG. 3 is a schematic time domain diagram of an example of a time-division multiplexing pattern according to an embodiment of this application.

In some examples, the first transmission time window and the second transmission time window may be alternately arranged in time sequence. The length of the first transmission time window is the same as that of the second transmission time window. For example, FIG. 3 is a schematic time domain diagram of an example of a time-division multiplexing pattern according to an embodiment of this application. As shown in FIG. 3, a first transmission time window includes x time slots. A second transmission time window includes x time slots. x is a positive integer, and a specific value of x can be set according to a work scenario and work requirements, which is not limited herein. For example, x can be a positive integer such as 1, 2, 3, or 5. It is worth noting that the first transmission time window and the second transmission time window may further be in a unit of radio frame, subframe, ms, symbol, or the like. For example, the first transmission time window and the second transmission time window each include m subframes.

The time-division multiplexing pattern shown in FIG. 3 may be applied to a scenario in which low delay is required in a service processed by UE1, for example, a service containing downlink data, having a large data packet, requiring continuous data transmission, and having a low delay, such as video viewing or webpage browsing, or a service containing uplink data, having a large data packet, requiring continuous data transmission, and having low sensitivity to a delay, such as sending a file or a data packet. For example, for a communications device supporting a "2RX+1TX" mode, data reception by the UE1 and data reception by UE2 can be performed synchronously. In a case that the UE2 needs to enter a RRC connection status for data transmission, signaling such as a medium access control layer channel element (MAC CE) is sent to a first network side device as a time-division multiplexing pattern request, to request response information of a time-division multiplexing pattern for the time-division multiplexing pattern shown in FIG. 3.

Figure 4:
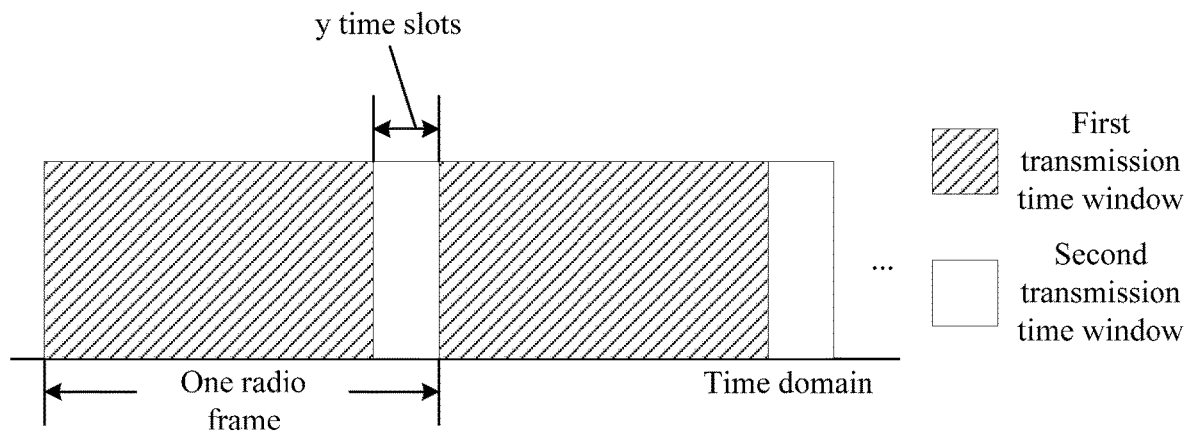
FIG. 4 is a schematic time domain diagram of another example of a time-division multiplexing pattern according to an embodiment of this application.

In some other examples, N second transmission time windows exist in every M radio frames. In each radio frame, a total length of the first transmission time window is greater than that of the second transmission time window. M and N are positive integers, and values of M and N can be set according to a work scenario and work requirements, which are not limited herein. For example, M=6, N=3, that is, three second transmission time windows exist in every six radio frames, no second transmission time window is set in first three radio frames, and one second transmission time window is set in each of last three radio frames. For another example, FIG. 4 is a schematic time domain diagram of another example of a time-division multiplexing pattern according to an embodiment of this application. M=1, N=1, that is, each radio frame has a second transmission time window. One second transmission time window includes y time slots. y is a positive integer, and a value of y can be set according to a work scenario and work requirements, which is not limited herein.

The time-division multiplexing pattern in FIG. 4 can be applied to a scenario in which a relatively high delay is required for a service processed by UE1, for example, a service that contains both uplink data and downlink data, having a small data packet, and being sensitive to a delay, such as a game, a live broadcast, voice. For example, if UE2 needs to enter a RRC connection status, the UE1's demand for a low delay is much greater than that of the UE2. Therefore, most time slots in a time domain are allocated to the UE1 as a first transmission time window, while the UE2 only uses a small part of time slots in the time domain to complete a corresponding necessary RRC connection status operation.

Figure 5:
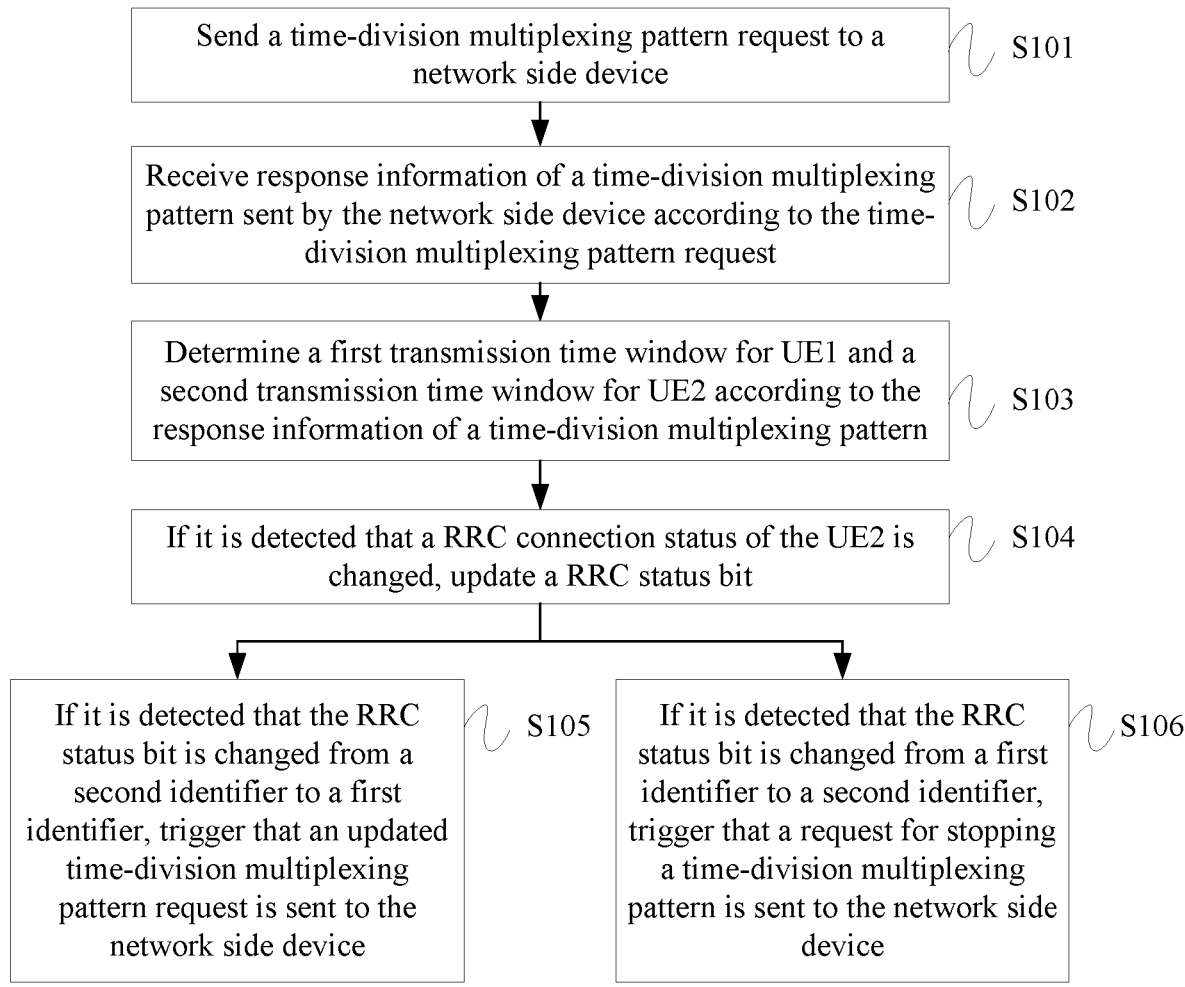
FIG. 5 is a flowchart of another embodiment of a resource scheduling method applied to the communications device according to this application.

FIG. 5 is a flowchart of another embodiment of a resource scheduling method applied to the communications device according to this application. A difference between the resource scheduling method shown in FIG. 5 and the resource scheduling method shown in FIG. 2 is that the resource scheduling method shown in FIG. 5 may further include step S104 and step S105 or step S106.

In step S104, if it is detected that a RRC connection status of the UE2 is changed, a RRC status bit is updated.

The change of the RRC connection status can be reflected in a change of a call scenario (that is, a paging occasion) of the UE2, the UE2 is handed over to a new cell that does not require a time-division multiplexing pattern, or the communications device receives a call delivered by a second network side device, or a tracking area identity list (TAI list) to which a cell indicated in a system message delivered by the second network side device belongs is changed, or TAU occurs in the UE2, which is not limited herein. Unlimitation of the TAU in the UE2 applies to a case in which the UE2 only detects that cell reselection is to be performed immediately, and can further include a case in which the cell reselection is about to be performed. For example, according to geographic location information and speed information, the UE2 determines that a TAU process is about to be performed, which can reflect sending information related to the TAU.

It should be noted that the change of the RRC connection status of the UE2 includes that the RRC connection status of the UE2 is about to be changed, the RRC connection status of the UE2 is being changed, and the RRC connection status of the UE2 has been changed.

Specifically, if the UE2 receives a RRC connection request, a RRC status bit is a first identifier. If the UE2 releases a RRC connection, the RRC status bit is a second identifier. The first identifier and the second identifier are different, and specific forms of the first identifier and the second identifier are not limited herein. For example, the first identifier is 1 and the second identifier is 0.

In step S105, if it is detected that the RRC status bit is changed from the second identifier to the first identifier, it is triggered that an updated time-division multiplexing pattern request is sent to a network side device.

If it is detected that the RRC status bit is changed from the second identifier to the first identifier, it means that the RRC connection status of the UE2 may be changed from an idle status to a connection status, and data transmission and reception of the UE2 will also be changed. A resource conflict may occur in the UE1 and UE2. Through the updated time-division multiplexing pattern request, it is triggered that the network side device updates response information of a time-division multiplexing pattern.

After the network side device updates configuration information of a time-division multiplexing pattern, the updated configuration information of a time-division multiplexing pattern will be sent to the communications device, and the communications device determines a new first transmission time window and a new second transmission time window according to the updated configuration information of a time-division multiplexing pattern. After the network side device updates confirmation information of a time-division multiplexing pattern, the updated confirmation information of a time-division multiplexing pattern will be sent to the communications device, and the communications device determines a new first transmission time window and a new second transmission time window in response to the updated confirmation information of a time-division multiplexing pattern.

In step S106, if it is detected that the RRC status bit is changed from the first identifier to the second identifier, it is triggered that a request for stopping a time-division multiplexing pattern is sent to the network side device.

If it is detected that the RRC status bit is changed from the first identifier to the second identifier, it means that the RRC connection status of the UE2 may be changed from the connection status to the idle status, and the second transmission time window may not be allocated for the UE2. Therefore, the communications device triggers a request, to the network side device, for stopping a time-division multiplexing pattern.

The request for stopping a time-division multiplexing pattern is used to indicate that the network side device stops configuring the time-division multiplexing pattern for the communications device. The network side device receives the request for stopping a time-division multiplexing pattern, and stops configuring the time-division multiplexing pattern for the communications device, so that the time-division multiplexing pattern for the communications device is canceled.

If the UE1 releases the RRC connection, the communications device automatically cancels configuration of the time-division multiplexing pattern.

In some examples, the communications device can further initiate a timer request to the network side device. The communications device can further receive timer response information fed back by the network side device according to the timer request. The timer response information may include valid duration information, and the valid duration information may be used to indicate valid duration. When configurations for the first transmission time window and the second transmission time window are valid, a timer is enabled to start timing. When the timer expires, that is, after the timer exceeds the valid duration indicated by the valid duration information, the configurations for the first transmission time window and the second transmission time window are invalid. That the configurations for the first transmission time window and the second transmission time window are valid means that the configuration information of a time-division multiplexing pattern or the confirmation information of a time-division multiplexing pattern is valid in the communications device.

That is, the first network side device can set valid duration of the time-division multiplexing pattern. The time-division multiplexing pattern is valid in the valid duration. The time-division multiplexing pattern is invalid after the valid duration expires.

Figure 6:
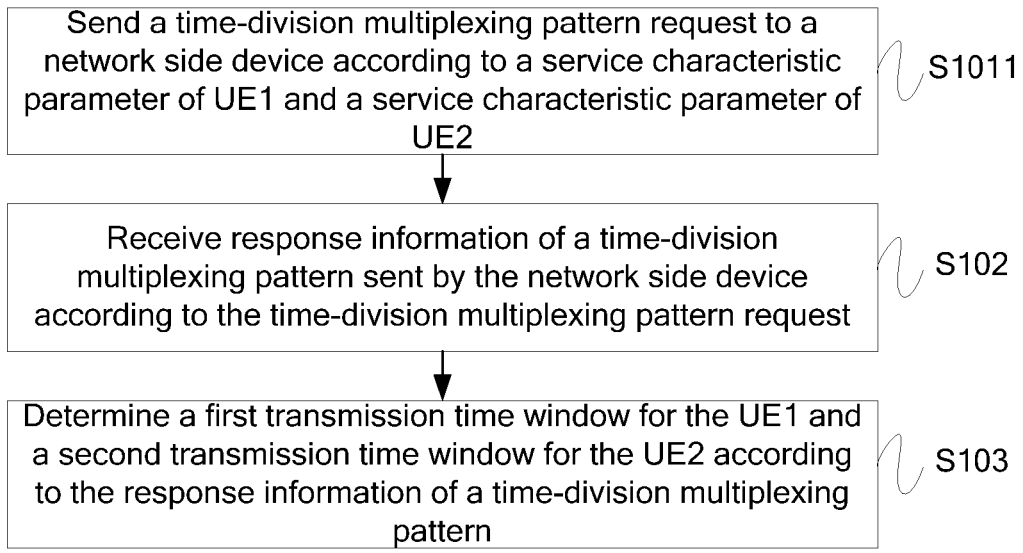
FIG. 6 is a flowchart of still another embodiment of a resource scheduling method applied to the communications device according to this application.

FIG. 6 is a flowchart of still another embodiment of a resource scheduling method applied to a communications device according to this application. A difference between the resource scheduling method shown in FIG. 6 and the resource scheduling method shown in FIG. 2 is that step S101 shown in FIG. 2 can be detailed as step S1011 shown in FIG. 6.

In step S1011, a time-division multiplexing pattern request is sent to a network side device according to a service characteristic parameter of UE1 and a service characteristic parameter of UE2.

The service characteristic parameter represents performance requirements of a service. The communications device can determine and send the time-division multiplexing pattern request according performance requirements of a UE1's service and performance requirements of a UE2's service. In some examples, the service characteristic parameter may include a characteristic parameter of service data packet arrival and/or a delay requirement parameter. A characteristic of the service data packet arrival can be inferred according to a data status of an application layer and a statistical result of data of the Transmission Control Protocol/Internet Protocol (TCP/IP). For example, the time-division multiplexing pattern request includes a time-division multiplexing pattern identifier, and two time-division multiplexing patterns agreed upon by the communications device and the network side device are the time-division multiplexing pattern shown in FIG. 3 and the time-division multiplexing pattern shown in FIG. 4 in the foregoing embodiments, respectively. The communications device determines that a UE1's service is an online game that requires high sensitivity to a delay according to the characteristic parameter of service data packet arrival and the delay requirement parameter of the UE1. According to a service characteristic parameter of the UE2, it is determined that a UE2's service is a service with low sensitivity to a delay. Correspondingly, the communications device generates a time-division multiplexing pattern request including the time-division multiplexing pattern identifier of the time-division multiplexing pattern shown in FIG. 3.

The time-division multiplexing pattern request may be generated periodically according to the service characteristic parameter of the UE1 and the service characteristic parameter of the UE2. For example, in a third period, the service characteristic parameter of the UE1 is changed. If an application of the UE1 requiring high sensitivity to a delay is disabled, a time-division multiplexing pattern request is regenerated and sent to the network side device.

It is worth mentioning that, when an instantaneous high data demand exists in the UE1, the communications device can temporarily cancel the time-division multiplexing pattern by itself.

Figure 7:
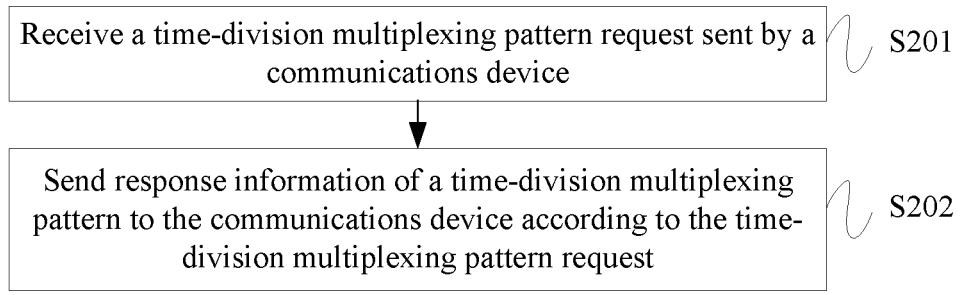
FIG. 7 is a flowchart of an embodiment of a resource scheduling method applied to a network device according to this application.

An embodiment of this application further provides a resource scheduling method, applied to a network device. The network device can be regarded as the network side device in the foregoing embodiment, and the network side device may include a first network side device and/or a second network side device. FIG. 7 is a flowchart of an embodiment of a resource scheduling method applied to a network device according to this application. As shown in FIG. 7, the resource scheduling method may include step S201 and step S202.

In step S201, a time-division multiplexing pattern request sent by a communications device is received.

The time-division multiplexing pattern request is used to request a first transmission time window for UE1 of the communications device and/or a second transmission time window for UE2 of the communications device.

In step S202, response information of a time-division multiplexing pattern is sent to the communications device according to the time-division multiplexing pattern request.

The response information of a time-division multiplexing pattern includes configuration information of a time-division multiplexing pattern or confirmation information of a time-division multiplexing pattern. The network device includes a first network side device, and the first network side device can send the configuration information of a time-division multiplexing pattern to the communications device, or the first network side device can send confirmation information of a time-division multiplexing pattern to the communications device. The network device includes a second network side device, and the second network side device can send the confirmation information of a time-division multiplexing pattern to the communications device, or the second network side device can send the configuration information of a time-division multiplexing pattern to the communications device. The network device includes the first network side device and the second network side device, the first network side device can send the configuration information of a time-division multiplexing pattern to the communications device, and the second network side device can send the confirmation information of a time-division multiplexing pattern to the communications device. Specific information sent by the network device to the communications device is not limited herein.

The first transmission time window and the second transmission time window that are indicated by the response information of a time-division multiplexing pattern do not overlap. The configuration information of a time-division multiplexing pattern may be used to at least represent configuration of the first transmission time window for the UE1 of the communications device. For example, the configuration information of a time-division multiplexing pattern may only represent the first transmission time window for the UE1. The communications device receives the configuration information of a time-division multiplexing pattern, and can use a time window not occupied by the first transmission time window in a time domain as the second transmission time window for the UE2. For another example, the configuration information of a time-division multiplexing pattern may represent the first transmission time window for the UE1 and the second transmission time window for the UE2, and the first transmission time window and the second transmission time window do not overlap.

In some examples, the first transmission time window and the second transmission time window may be alternately arranged in time sequence. The length of the first transmission time window is the same as that of the second transmission time window. For example, the first transmission time window includes x time slots. The second transmission time window includes x time slots. x is a positive integer.

In some other examples, N second transmission time windows exist in every M radio frames. In each radio frame, a total length of the first transmission time window is greater than that of the second transmission time window. M and N are positive integers. For example, one second transmission time window includes y time slots. y is a positive integer.

In this embodiment of this application, the network device receives the time-division multiplexing pattern request sent by the communications device, and sends the response information of a time-division multiplexing pattern to the communications device according to the time-division multiplexing pattern request, so that the communications device can determine the first transmission time window for the UE1 and the second transmission time window for the UE2 in the communications device. It can be ensured that the UE1 and UE2 in the communications device perform data transmission and reception within their respective transmission time windows, thereby preventing a resource conflict between the UE1 and UE2. It can be ensured that services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network device can also obtain a status of the communications device, so as to facilitate coordination between the network device and the communications device.

In some examples, the network device can further receive a timer request sent by the communications device; and feed back timer response information to the communications device in response to the timer request. The timer response information may include valid duration information. The valid duration information may indicate valid duration configured for the first transmission time window and the second transmission time window, so that the valid duration for the first transmission time window and the second transmission time window in the communications device can be set, and a life cycle of the time-division multiplexing pattern in the communications device can be automatically controlled.

In some examples, the network device can further receive an updated time-division multiplexing pattern request sent by the communications device; update the response information of a time-division multiplexing pattern in response to the updated time-division multiplexing pattern request, and send the updated response information of a time-division multiplexing pattern to the communications device. The network device updates the time-division multiplexing pattern used by the communications device through the response information of a time-division multiplexing pattern, to ensure applicability and real-time effectiveness of the time-division multiplexing pattern in the communications device.

In some examples, the network device can further receive a request for stopping a time-division multiplexing pattern sent by the communications device; and stop configuring the time-division multiplexing pattern for the communications device in response to the request for stopping a time-division multiplexing pattern. The network device stops configuring the time-division multiplexing pattern for the communications device, and in a case that the time-division multiplexing pattern is not required to be used in the communications device, configuration of the time-division multiplexing pattern for the communications device is stopped, so that the time-division multiplexing pattern in the communications device can be stopped.

For some content of the resource scheduling method applied to the network device, reference may be made to the relevant description of the resource scheduling method applied to the communications device in the foregoing embodiment, and details are not described herein again.

Figure 8:
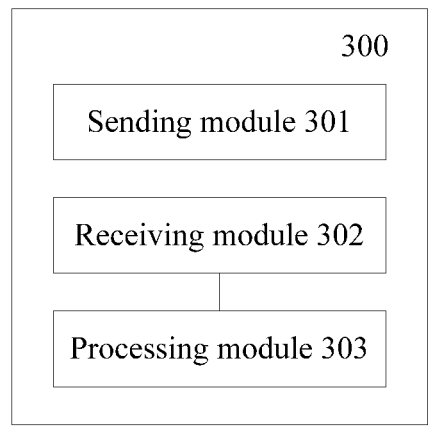
FIG. 8 is a schematic structural diagram of an embodiment of a communications device according to this application.

An embodiment of this application further provides a communications device, where the communications device has a first terminal UE1 and a second terminal UE2. FIG. 8 is a schematic structural diagram of an embodiment of the communications device according to this application. As shown in FIG. 8, the communications device 300 may include a sending module 301, a receiving module 302, and a processing module 303.

The sending module 301 is configured to send a time-division multiplexing pattern request to a network side device.

The network side device includes a first network side device and/or a second network side device.

The receiving module 302 is configured to receive response information of a time-division multiplexing pattern sent by the network side device according to the time-division multiplexing pattern request.

The response information of a time-division multiplexing pattern includes configuration information of a time-division multiplexing pattern and/or confirmation information of a time-division multiplexing pattern.

The processing module 303 is configured to determine a first transmission time window for the UE1 and a second transmission time window for the UE2 according to the response information of a time-division multiplexing pattern.

The first transmission time window and the second transmission time window do not overlap.

In this embodiment of this application, the communications device sends the time-division multiplexing request to the network side device, and requests the response information of a time-division multiplexing pattern to the network side device. The first transmission time window for the UE1 and the second transmission time window for the UE2 are determined according to the response information of a time-division multiplexing pattern sent by the network side device. The response information of a time-division multiplexing pattern may include the configuration information of a time-division multiplexing pattern and/or the confirmation information of a time-division multiplexing pattern. The first transmission time window and the second transmission time window do not overlap, so that the UE1 and UE2 can be handed over quickly and send and receive data respectively in different transmission time windows, so as to prevent a resource conflict between the UE1 and UE2.

Therefore, services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network side device can also obtain a status of the communications device, so as to facilitate coordination between the network side device and the communications device.

In some examples, the first transmission time window and the second transmission time window may be alternately arranged in time sequence. The length of the first transmission time window is the same as that of the second transmission time window. For example, the first transmission time window includes X time slots and the second transmission time window includes X time slots. X is a positive integer.

In some other examples, N second transmission time windows exist in every M radio frames. In each radio frame, a total length of the first transmission time window is greater than that of the second transmission time window. M and N are positive integers. For example, one second transmission time window includes y time slots. y is a positive integer.

Specifically, the time-division multiplexing pattern request includes a time-division multiplexing pattern identifier. Alternatively, the time-division multiplexing pattern request includes the time-division multiplexing pattern identifier and a time slot offset.

The time-division multiplexing pattern identifier is used to identify the time-division multiplexing pattern. The time slot offset is used to represent a position of a time window not occupied by the first transmission time window in a time domain or a position of the second transmission time window in the time domain.

In some examples, the configuration information of a time-division multiplexing pattern is used to indicate at least one of the following: the first transmission time window, the second transmission time window, and the time window not occupied by the first transmission time window in the time domain.

The time window not occupied by the first transmission time window in the time domain includes the second transmission time window.

In some examples, the sending module 301 is specifically configured to: send the time-division multiplexing pattern request to the network side device according to a service characteristic parameter of the UE1 and a service characteristic parameter of the UE2.

A service characteristic parameter represents performance requirements of a service. Specifically, the service characteristic parameter includes a characteristic parameter of service data packet arrival and/or a delay requirement parameter.

Figure 9:
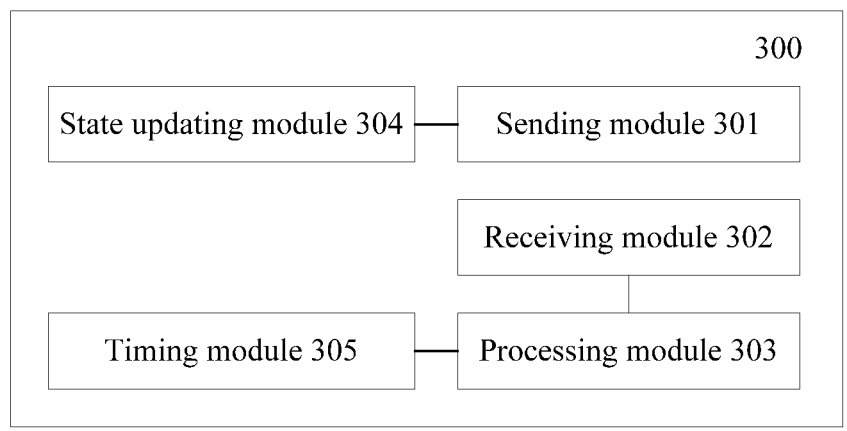
FIG. 9 is a schematic structural diagram of another embodiment of the communications device according to this application.

FIG. 9 is a schematic structural diagram of another embodiment of the communications device according to this application. A difference between the communications device shown in FIG. 9 and the communications device shown in FIG. 8 is that the communications device shown in FIG. 9 may further include a status update module 304 and a timing module 305.

The status update module 304 is configured to update a RRC status bit if it is detected that a RRC connection status of UE2 is changed.

UE1 in the communications device 300 stores a radio resource control RRC status bit of the UE2. If the UE2 receives a RRC connection request, the RRC status bit is a first identifier; and if the UE2 releases a RRC connection, the RRC status bit is a second identifier.

In some examples, the sending module 301 is further configured to trigger, if it is detected that the RRC status bit is changed from the second identifier to the first identifier, an updated time-division multiplexing pattern request is sent to the network side device.

The sending module 301 is further configured to trigger, if it is detected that the RRC status bit is changed from the first identifier to the second identifier, a request for stopping a time-division multiplexing pattern is sent to the network side device. The request for stopping a time-division multiplexing pattern is used to indicate that the network side device stops configuring the time-division multiplexing pattern for the communications device.

The timing module 305 is configured to start timing when configurations for the first transmission time window and the second transmission time window are valid. When the timing module 305 expires, it is triggered that configurations for the first transmission time window and the second transmission time window configured by the processing module 303 are invalid. The timing module 305 may be implemented as a timer.

Figure 10:
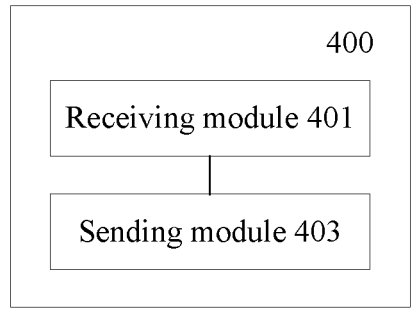
FIG. 10 is a schematic structural diagram of an embodiment of a network device according to this application.

This embodiment of this application further provides a network device. FIG. 10 is a schematic structural diagram of an embodiment of a network device according to this application. As shown in FIG. 10, the network device 400 can include a receiving module 401 and a sending module 403.

The receiving module 401 is configured to receive a time-division multiplexing pattern request sent by a communications device.

The time-division multiplexing pattern request is used to request a first transmission time window for UE1 of the communications device and/or a second transmission time window for UE2 of the communications device.

The sending module 403 is configured to send response information of a time-division multiplexing pattern to the communications device according to the time-division multiplexing pattern request.

The response information of a time-division multiplexing pattern includes configuration information or confirmation information of a time-division multiplexing pattern. The first transmission time window and the second transmission time window that are indicated by the response information of a time-division multiplexing pattern do not overlap.

In this embodiment of this application, the network device receives the time-division multiplexing request sent by the communications device, and sends the response information of a time-division multiplexing pattern to the communications device according to the time-division multiplexing pattern request, so that the communications device can determine the first transmission time window for the UE1 and the second transmission time window for the UE2 in the communications device. It can be ensured that the UE1 and UE2 in the communications device perform data transmission and reception within their respective transmission time windows, thereby preventing a resource conflict between the UE1 and UE2. It can be ensured that services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network device can also obtain a status of the communications device, so as to facilitate coordination between the network device and the communications device.

In some examples, the first transmission time window and the second transmission time window may be alternately arranged in time sequence. The length of the first transmission time window is the same as that of the second transmission time window. For example, the first transmission time window includes x time slots. The second transmission time window includes x time slots. x is a positive integer.

In some other examples, N second transmission time windows exist in every M radio frames. In each radio frame, a total length of the first transmission time window is greater than that of the second transmission time window. M and N are positive integers. For example, one second transmission time window includes y time slots. M, N, and y are positive integers.

In some examples, the receiving module 401 is further configured to receive an updated time-division multiplexing pattern request sent by the communications device.

The sending module 403 is further configured to update the response information of a time-division multiplexing pattern in response to the updated time-division multiplexing pattern request, and send the updated response information of a time-division multiplexing pattern to the communications device.

In some examples, the receiving module 401 is further configured to receive a request for stopping a time-division multiplexing pattern sent by the communications device.

The processing module is further configured to stop configuration of the time-division multiplexing pattern for the communications device in response to the request for stopping a time-division multiplexing pattern.

The communications device provided in this embodiment of this application can implement all processes implemented by the communications device in method embodiments shown in FIG. 2, FIG. 5, and FIG. 6, and to prevent repetition, details are not described herein again.

Figure 11:
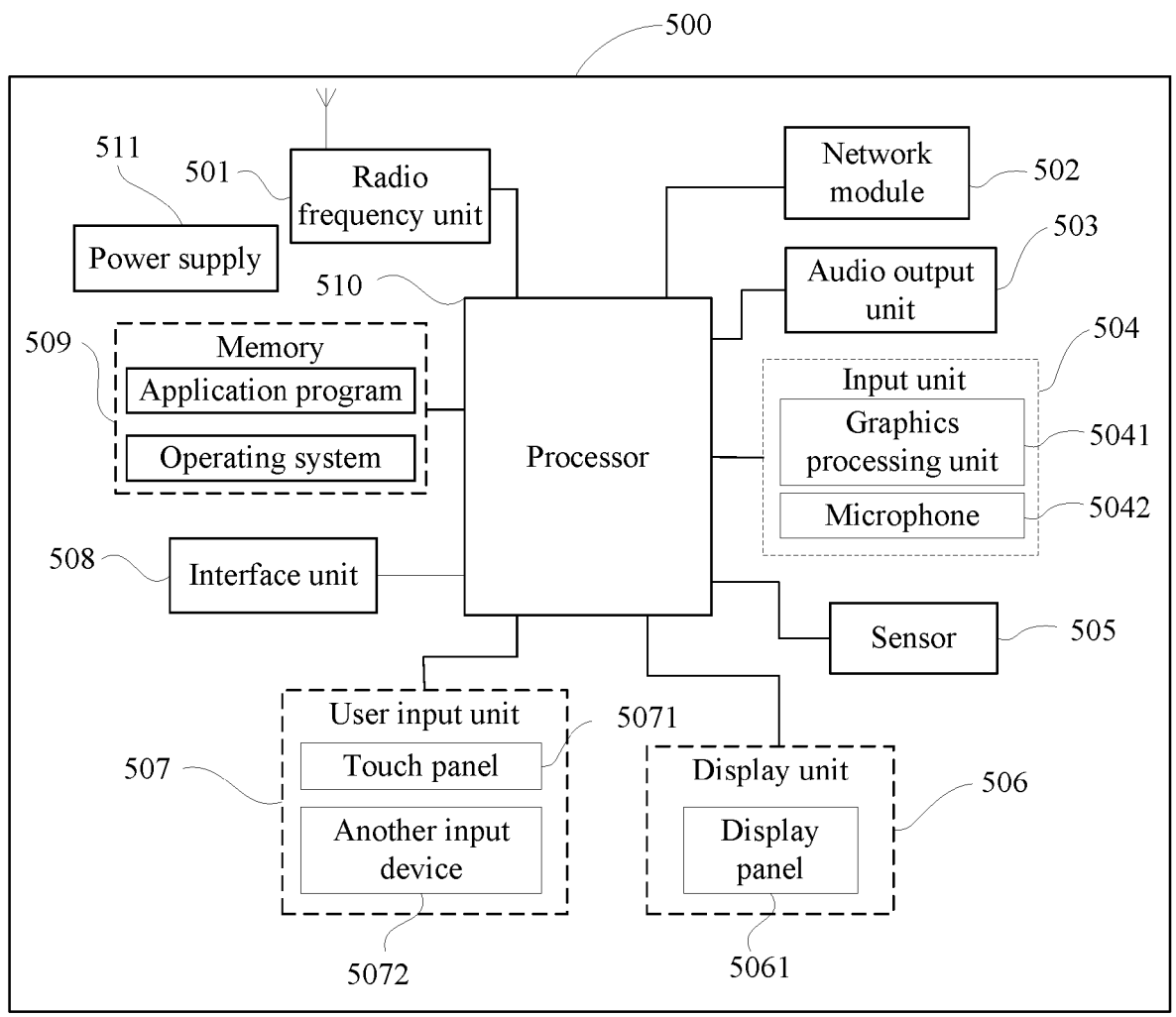
FIG. 11 is a schematic structural diagram of hardware of an embodiment of the communications device according to this application.

FIG. 11 is a schematic structural diagram of hardware of an embodiment of the communications device according to this application. The communications device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. It can be understood by persons skilled in the art that, the structure of the communications device shown in FIG. 11 does not constitute any limitation on the communications device, and the communications device may include more or fewer components than those shown in the figure, or combine some components, or have different component arrangements. In this embodiment of this application, the communications device includes but is not limited to a mobile phone, a tablet computer, a notebook computer, a palmtop computer, a vehicle-mounted terminal, a wearable device, a pedometer, and the like.

The radio frequency unit 501 is configured to send a time-division multiplexing pattern request to a network side device, and is configured to receive response information of a time-division multiplexing pattern sent by the network side device according to the time-division multiplexing pattern request.

The response information of a time-division multiplexing pattern includes configuration information of a time-division multiplexing pattern and/or confirmation information of a time-division multiplexing pattern. The network side device includes a first network side device and/or a second network side device.

The processor 510 is configured to determine a first transmission time window for UE1 and a second transmission time window for UE2 according to the response information of a time-division multiplexing pattern. The first transmission time window and the second transmission time window do not overlap.

In this embodiment of this application, the communications device sends the time-division multiplexing request to the network side device, and requests the response information of a time-division multiplexing pattern to the network side device. The first transmission time window for the UE1 and the second transmission time window for the UE2 are determined according to the response information of a time-division multiplexing pattern sent by the network side device. The response information of a time-division multiplexing pattern may include the configuration information of a time-division multiplexing pattern and/or the confirmation information of a time-division multiplexing pattern. The first transmission time window and the second transmission time window do not overlap, so that the UE1 and UE2 can be handed over quickly and send and receive data respectively in different transmission time windows, so as to prevent a resource conflict between the UE1 and UE2. Therefore, services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network side device can also obtain a status of the communications device, so as to facilitate coordination between the network side device and the communications device.

It should be understood that, in this embodiment of this application, the radio frequency unit 501 may be configured to receive and send information or a signal in a call process. Specifically, after receiving downlink data from a base station, the radio frequency unit 501 sends the downlink data to the processor 510 for processing. In addition, the radio frequency unit 501 sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communications system.

The communications device provides wireless broadband Internet access for a user by using the network module 502, for example, help the user transmit and receive an e-mail, browse a website, and access stream media.

The audio output unit 503 may convert audio data received by the radio frequency unit 501 or the network module 502 or stored in the memory 509 into an audio signal and output the audio signal as a sound. In addition, the audio output unit 503 may further provide an audio output (for example, a call signal received voice, or a message received voice) related to a specific function implemented by the communications device 500. The audio output unit 503 includes a loudspeaker, a buzzer, a telephone receiver, and the like.

The input unit 504 is configured to receive an audio signal or a video signal. The input unit 504 may include a graphics processing unit (GPU) 5041 and a microphone 5042. The graphics processing unit 5041 processes image data of a static image or video obtained by an image capture apparatus (such as, a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. Processed audio data may be converted, in a call mode, into a format that can be sent to a mobile communication base station by using the radio frequency unit 501 for output.

The communications device 500 further includes at least one sensor 505, such as an optical sensor, a motion sensor, and another sensor. Specifically, the optical sensor includes an ambient light sensor and a proximity sensor. The ambient light sensor may adjust luminance of the display panel 5061 based on brightness of ambient light, and the proximity sensor may disable the display panel 5061 and/or back light when the communications device 500 approaches an ear. As a type of the motion sensor, an accelerometer sensor may detect an acceleration value in each direction (generally, three axes), and detect a value and a direction of gravity when the accelerometer sensor is static, and may be used in an application for recognizing a posture of the communications device (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by a user or information provided for a user. The display unit 506 may include a display panel 5061, and the display panel 5061 may be configured in a form of a liquid crystal display (LCD), an organic light-emitting diode (OLED), or the like.

The user input unit 507 may be configured to receive input numeral or character information, and generate key signal input related to user setting and function control that are of the communications device. Specifically, the user input unit 507 includes a touch panel 5071 and another input device 5072. The touch panel 5071, also referred to as a touchscreen, may collect a touch operation performed by the user on or near the touch panel (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented by using a plurality of types such as a resistive type, a capacitive type, an infrared ray, and a surface acoustic wave. The user input unit 507 may include other input devices 5072 in addition to the touch panel 5071. Specifically, the other input devices 5072 may include but is not limited to a physical keyboard, a function key (such as a volume control key or a power on/off key), a trackball, a mouse, a joystick, and the like. Details are not described herein.

Further, the touch panel 5071 may cover the display panel 5061. After detecting the touch operation on or near the touch panel 5071, the touch panel transmits the touch operation to the processor 510 to determine a type of a touch event, and then the processor 510 provides corresponding visual output on the display panel 5061 based on the type of the touch event. In FIG. 11, although the touch panel 5071 and the display panel 5061 are used as two independent parts to implement input and output functions of the communications device, in some embodiments, the touch panel 5071 and the display panel 5061 may be integrated to implement the input and output functions of the communications device. This is not specifically limited herein.

The interface unit 508 is an interface for connecting an external apparatus and the communications device 500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive input (for example, data information and power) from an external apparatus and transmit the received input to one or more elements in the communications device 500 or may be configured to transmit data between the communications device 500 and the external apparatus.

The memory 509 may be configured to store a software program and various pieces of data. The memory 509 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 509 may include a high-speed random access memory, and may further include a nonvolatile memory, for example, at least one magnetic disk storage device, a flash storage device, or another volatile solid-state storage device.

The processor 510 is a control center of the communications device, is connected to all parts of the entire communications device by using various interfaces and lines, and executes various functions of the communications device and processes data by running or executing the software program and/or the module stored in the memory 509 and by invoking data stored in the memory 509, so as to perform overall monitoring on the communications device. The processor 510 may include one or more processing units. Optionally, the processor 510 may integrate an application processor and a modem processor. The application processor mainly deals with an operating system, a user interface, an application program, and the like. The modem processor mainly deals with wireless communication. It can be understood that the foregoing modem processor may not be integrated into the processor 510.

The communications device 500 may further include the power supply 511 (such as a battery) that supplies power to each component. Optionally, the power supply 511 may be logically connected to the processor 510 by using a power management system, to implement functions such as charging, discharging, and power consumption management by using the power management system.

In addition, the communications device 500 includes some function modules not shown, and details are not described herein.

Optionally, this embodiment of this application further provides a communications device, including the processor 510, the memory 509, a computer program that is stored in the memory 509 and that can be run on the processor 510, where when the computer program is executed by the processor 510, processes of the foregoing embodiments of the resource scheduling method applied to the communications device can be implemented, and the same technical effect can be achieved. To avoid repetition, details are not herein again.

Figure 12:
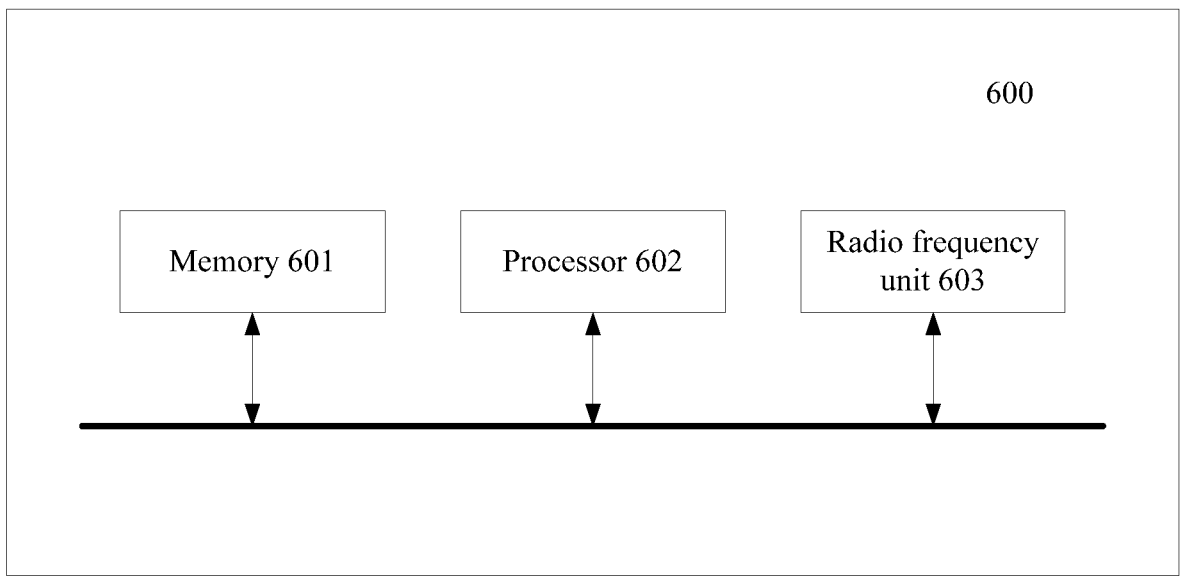
FIG. 12 is a schematic structural diagram of hardware of an embodiment of the network device according to this application.

FIG. 12 is a schematic structural diagram of hardware of an embodiment of the network device according to this application. As shown in FIG. 12, the network device 600 includes: a memory 601, a processor 602, a radio frequency unit 603, and a computer program that is stored in the memory 601 and that can be run on the processor 602. A person skilled in the art can understand that a structure of the network device shown in FIG. 12 does not constitute a limitation on the network device, and the network device may include more or fewer components than those shown in the figure, or combine some components, or have a different component arrangement.

The radio frequency unit 603 is configured to receive a time-division multiplexing pattern request sent by a communications device, and is configured to send response information of a time-division multiplexing pattern to the communications device according to the time-division multiplexing pattern request.

The response information of a time-division multiplexing pattern includes configuration information of a time-division multiplexing pattern or confirmation information of a time-division multiplexing pattern. The time-division multiplexing pattern request is used to request a first transmission time window for UE1 of the communications device and/or a second transmission time window for UE2 of the communications device. The first transmission time window and the second transmission time window that are indicated by the response information of a time-division multiplexing pattern do not overlap.

In this embodiment of this application, the network device receives the time-division multiplexing pattern request sent by the communications device, and sends the response information of a time-division multiplexing pattern to the communications device according to the time-division multiplexing pattern request, so that the communications device can determine the first transmission time window for the UE1 and the second transmission time window for the UE2 in the communications device. It can be ensured that the UE1 and UE2 in the communications device perform data transmission and reception within their respective transmission time windows, thereby preventing a resource conflict between the UE1 and UE2. It can be ensured that services of the UE1 and UE2 can be processed separately, and reliability for service processing of the communications device can be improved. The UE1 and UE2 in the communications device can share hardware resources without conflict, which reduces a restriction of resource scheduling between the UE1 and UE2. The network device can also obtain a status of the communications device, so as to facilitate coordination between the network device and the communications device.

In FIG. 12, a bus architecture may include any quantity of interconnected buses and bridges, and specifically links various circuits of one or more processors represented by the processor 602 and a memory represented by the memory 601. The bus architecture may further link various other circuits such as a peripheral device, a voltage regulator, and a power management circuit together. These are all well-known in the art, and therefore are not further described in this specification. The bus interface provides interfaces. The radio frequency unit 603 may be a plurality of elements, that is, include a transmitter and a transceiver, and provide a unit configured to communicate with various other apparatuses on a transmission medium, and is configured to receive and send data under the control of the processor 602. The processor 602 is responsible for managing the bus architecture and common processing, and the memory 601 may store data used when the processor 602 performs an operation.

Optionally, this embodiment of this application further provides a network device, including the processor 602, the memory 601, and a computer program that is stored in the memory 601 and that can be run on the processor 602, where when computer program is executed by the processor 602, processes of the foregoing embodiments of the resource scheduling method for the network device shown in FIG. 7 can be implemented, and the same technical effect can be achieved. To avoid repetition, details are not described herein again.

An embodiment of this application further provide a resource scheduling system, where the resource scheduling system includes the communications device and network device in the foregoing embodiments. For details, please refer to relevant descriptions in the foregoing embodiments, which will not be described herein again.

An embodiment of this application further provides a computer-readable storage medium, where the computer-readable storage medium stores a computer program, and when the computer program is executed by a processor, the processes of the foregoing embodiments of the resource scheduling method, applied to a communications device or network device, are implemented, and the same technical effect can be achieved. To avoid repetition, details are not described herein again. The computer-readable storage medium includes a read-only memory (ROM), a random access memory (RAM), a magnetic disk, or an optical disc.

The resource scheduling method, communications device, network device, system and storage medium in the foregoing embodiments can be applied to a Long Term Evolution (LTE) communications system, a 5G communications system, and a subsequent communications system, which are not limited herein.

The embodiments in this specification are described in a progressive manner, and that the same or similar parts among the embodiments can be referred to each other. Each embodiment focuses on the differences from other embodiments. For the resource scheduling method applied to the network device, the embodiments of the communications device, the embodiments of the network device, and the embodiments of the computer-readable storage medium, reference may be made to the description of the method embodiment.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiments may be implemented by software in addition to a necessary universal hardware platform or by hardware only. In most circumstances, the former is a preferred implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

All aspects of this application are described above with reference to flowcharts and/or block diagrams of methods, apparatus (systems), and machine program products according to embodiments of this application. It should be understood that each block in a flowchart and/or block diagram, and a combination of blocks in the flowchart and/or block diagram may be implemented by programs or instructions. Those programs or instructions may be provided for a general-purpose computer, a dedicated computer, or a processor of any other programmable data processing device to generate a machine, so that the functions/actions specified in one or more blocks in the flowcharts and/or block diagrams may be implemented via those programs or instructions executed by the computer or any other programmable data processing device. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

The embodiments of this application are described above with reference to the accompanying drawings, but this application is not limited to the foregoing specific implementations, and the foregoing specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A resource scheduling method, performed by a communications device, wherein the communications device comprises a first terminal UE1 and a second terminal UE2, and the method comprises:
    sending a time-division multiplexing pattern request to a network side device, wherein the network side device comprises a first network side device and/or a second network side device;
    receiving response information of a time-division multiplexing pattern sent by the network side device according to the time-division multiplexing pattern request, wherein the response information of a time-division multiplexing pattern comprises configuration information of a time-division multiplexing pattern; and
    determining a first transmission time window for the UE1 and a second transmission time window for the UE2 according to the response information of a time-division multiplexing pattern, wherein the first transmission time window and the second transmission time window do not overlap;
    wherein the communications device and the network side device pre-stipulate a plurality of time-division multiplexing patterns;
    the time-division multiplexing pattern request comprises a time-division multiplexing pattern identifier and a time slot offset;
    wherein the time-division multiplexing pattern identifier is used to identify one of the plurality of time-division multiplexing patterns, and the time slot offset is used to represent a position of the second transmission time window in the time domain.

2. The method according to claim 1, wherein
the first transmission time window and the second transmission time window are alternately arranged in time sequence,
    wherein a length of the first transmission time window is the same as that of the second transmission time window.

3. The method according to claim 1, wherein
N second transmission time windows exist in every M radio frames, and M and N are positive integers,
    wherein in each of the radio frames, a total length of the first transmission time window is greater than that of the second transmission time window.

4. The method according to claim 1, wherein the configuration information of a time-division multiplexing pattern is used to indicate at least one of the following:
    the first transmission time window, the second transmission time window, and a time window not occupied by the first transmission time window in a time domain,
    wherein the time window not occupied by the first time window in the time domain comprises the second transmission time window.

5. The method according to claim 1, wherein the UE1 in the communications device stores a radio resource control (RRC) status bit of the UE2, and
    the method further comprises:
    if it is detected that a RRC connection status of the UE2 is changed, the RRC status bit is updated.

6. The method according to claim 5, wherein
    if the UE2 receives a RRC connection request, the RRC status bit is a first identifier; or
    if the UE2 releases a RRC connection, the RRC status bit is a second identifier.

7. The method according to claim 6, further comprising:
    if it is detected that the RRC status bit is changed from the second identifier to the first identifier, it is triggered that an updated time-division multiplexing pattern request is sent to the network side device.

8. The method according to claim 6, further comprising:
    if it is detected that the RRC status bit is changed from the first identifier to the second identifier, it is triggered that a request for stopping a time-division multiplexing pattern is sent to the network side device, and the request for stopping a time-division multiplexing pattern is used to indicate that the network side device stops configuring a time-division multiplexing pattern for the communications device.

9. The method according to claim 1, further comprising:
    when configurations for the first transmission time window and the second transmission time window are valid, a timer is enabled; and
    when the timer expires, the configurations for the first transmission time window and the second transmission time window are invalid.

10. The method according to claim 1, wherein the sending a time-division multiplexing pattern request to a network side device comprises:
    sending the time-division multiplexing pattern request to the network side device according to a service characteristic parameter of the UE1 and a service characteristic parameter of the UE2, wherein the service characteristic parameter represents performance requirements of a service.

11. The method according to claim 10, wherein the service characteristic parameter comprises a characteristic parameter of service data packet arrival and/or a delay requirement parameter.

12. A communications device, comprising a processor, a memory, and a computer program that is stored in the memory and that can be run on the processor, wherein when the computer program is executed by the processor, the resource scheduling method according to claim 1 is implemented.

13. A non-transitory computer-readable storage medium, wherein the computer-readable storage medium stores a computer program, and when the computer program is executed by a processor, the resource scheduling method according to claim 1 is implemented.

14. A resource scheduling method, performed by a network device and comprising:
    receiving a time-division multiplexing pattern request sent by a communications device, wherein the time-division multiplexing pattern request is used to request a first transmission time window for a first terminal UE1 of the communications device and a second transmission time window for a second terminal UE2 of the communications device; and sending response information of a time-division multiplexing pattern to the communications device according to the time-division multiplexing pattern request, wherein the response information of a time-division multiplexing pattern comprises configuration information of a time-division multiplexing pattern, wherein the first transmission time window and the second transmission time window that are indicated by the response information of a time-division multiplexing pattern do not overlap;

wherein the communications device and the network side device pre-stipulate a plurality of time-division multiplexing patterns;

the time-division multiplexing pattern request comprises a time-division multiplexing pattern identifier and a time slot offset;

wherein the time-division multiplexing pattern identifier is used to identify one of the plurality of time-division multiplexing patterns, and the time slot offset is used to represent a position of the second transmission time window in the time domain.

15. The method according to claim 14, wherein the first transmission time window and the second transmission time window are alternately arranged in time sequence, wherein a length of the first transmission time window is the same as that of the second transmission time window.

16. The method according to claim 14, wherein

N second transmission time windows exist in every M radio frames, and M and N are positive integers, wherein in each of the radio frames, a total length of the first transmission time window is greater than that of the second transmission time window.

17. The method according to claim 14, further comprising:

receiving an updated time-division multiplexing pattern request sent by the communications device; and updating the response information of a time-division multiplexing pattern in response to the updated time-division multiplexing pattern request, and sending the updated response information of a time-division multiplexing pattern to the communications device.

18. The method according to claim 14, further comprising:

receiving a request for stopping a time-division multiplexing pattern sent by the communications device; and stopping configuring a time-division multiplexing pattern for the communications device in response to the request for stopping a time-division multiplexing pattern.

19. A network device, comprising a processor, a memory, and a computer program that is stored in the memory and that can be run on the processor, wherein when the computer program is executed by the processor, the resource scheduling method according to claim 14 is implemented.

* * * * *